United States Patent
Li et al.

(10) Patent No.: US 10,879,762 B2
(45) Date of Patent: Dec. 29, 2020

(54) ACTUATOR AND PUMP USING THE ACTUATOR

(71) Applicant: Johnson Electric S.A., Murten (CH)

(72) Inventors: Yong Bin Li, Hong Kong (CN); Chuan Lin Zhao, Shenzhen (CN); Ping Wang, Shenzhen (CN); Sheng Li Li, Shenzhen (CN)

(73) Assignee: JOHNSON ELECTRIC INTERNATIONAL AG, Murten (CH)

( * ) Notice: Subject to any disclaimer, the term of this patent is extended or adjusted under 35 U.S.C. 154(b) by 302 days.

(21) Appl. No.: 15/360,126

(22) Filed: Nov. 23, 2016

(65) Prior Publication Data

US 2017/0149304 A1    May 25, 2017

(30) Foreign Application Priority Data

Nov. 23, 2015 (CN) .......................... 2015 1 0818236

(51) Int. Cl.
| | |
|---|---|
| *H02K 7/116* | (2006.01) |
| *H02K 7/14* | (2006.01) |
| *H02K 7/075* | (2006.01) |
| *H02K 1/12* | (2006.01) |
| *H02K 1/27* | (2006.01) |

(Continued)

(52) U.S. Cl.
CPC ............... *H02K 7/116* (2013.01); *H02K 1/12* (2013.01); *H02K 1/2786* (2013.01); *H02K 7/075* (2013.01); *H02K 7/08* (2013.01); *H02K 7/14* (2013.01); *H02K 5/15* (2013.01); *H02K 5/16* (2013.01); *H02K 5/163* (2013.01); *H02K 5/167* (2013.01); *H02K 5/1675* (2013.01); *H02K 5/1735* (2013.01); *H02K 7/085* (2013.01); *H02K 11/33* (2016.01); *H02K 21/22* (2013.01)

(58) Field of Classification Search
CPC ........ H02K 11/33; H02K 1/12; H02K 1/2786; H02K 21/22; H02K 7/075; H02K 7/08; H02K 7/085; H02K 7/116; H02K 7/14; H02K 5/1285; H02K 2005/1287; H02K 5/132; H02K 5/163; H02K 5/1675; H02K 5/1735; H02K 5/675; H02K 5/167; H02K 5/15; H02K 5/16
USPC .......................................................... 310/67
See application file for complete search history.

(56) References Cited

U.S. PATENT DOCUMENTS

| | | | | |
|---|---|---|---|---|
| 4,286,187 | A * | 8/1981 | Binder ................. | H02K 7/1815 310/112 |
| 5,960,776 | A * | 10/1999 | Everingham ....... | F16K 31/0655 123/568.26 |

(Continued)

FOREIGN PATENT DOCUMENTS

| | | |
|---|---|---|
| JP | 2000297744 A | 10/2000 |
| JP | 2004245067 A | 9/2004 |

*Primary Examiner* — Shawki S Ismail
*Assistant Examiner* — Demetries A Gibson
(74) *Attorney, Agent, or Firm* — Muncy, Geissler, Olds & Lowe, P.C.

(57) ABSTRACT

A actuator and a pump using the actuator are provided. The actuator is used to drive a pump body. The actuator includes a base, a transmission assembly and a motor received in the base. The motor includes a stator, a rotor, and a driving shaft. The driving shaft is connected to the transmission assembly. The base includes a mounting bracket. The mounting bracket is partly embedded in the motor. The actuator has good integrality and a compact structure.

16 Claims, 6 Drawing Sheets

(51) Int. Cl.
*H02K 7/08* (2006.01)
*H02K 5/16* (2006.01)
*H02K 5/167* (2006.01)
*H02K 5/173* (2006.01)
*H02K 5/15* (2006.01)
*H02K 11/33* (2016.01)
*H02K 21/22* (2006.01)

(56) References Cited

U.S. PATENT DOCUMENTS

| | | | | |
|---|---|---|---|---|
| 6,000,919 | A * | 12/1999 | Hsieh | F04D 29/646 415/220 |
| 2007/0020125 | A1 * | 1/2007 | Oyama | B60T 8/4022 417/415 |
| 2007/0040463 | A1 * | 2/2007 | Zorweg | H02K 5/04 310/83 |
| 2008/0224553 | A1 * | 9/2008 | Abe | H02K 5/15 310/71 |
| 2010/0158714 | A1 * | 6/2010 | Werson | F04D 13/064 417/366 |
| 2013/0106115 | A1 * | 5/2013 | Liao | H02K 7/183 290/1 B |
| 2013/0194907 | A1 | 8/2013 | Kodama et al. | |
| 2013/0257232 | A1 * | 10/2013 | Tomizawa | H02K 29/08 310/68 R |
| 2013/0259720 | A1 * | 10/2013 | Mills | F04D 29/5806 417/410.1 |
| 2014/0020491 | A1 * | 1/2014 | Palfenier | H02K 29/08 74/421 A |
| 2014/0026529 | A1 * | 1/2014 | Wu | A01D 34/78 56/12.7 |
| 2015/0040515 | A1 * | 2/2015 | Molinari | B65C 9/04 53/127 |
| 2016/0238105 | A1 * | 8/2016 | Moore | F16H 1/10 |
| 2017/0058908 | A1 * | 3/2017 | Li | F04D 13/0626 |
| 2018/0159390 | A1 * | 6/2018 | Guigou | H02K 21/22 |

* cited by examiner

ACTUATOR AND PUMP USING THE ACTUATOR

CROSS REFERENCE TO RELATED APPLICATIONS

This non-provisional patent application claims priority under 35 U.S.C. § 119(a) from Patent Application No. 201510818236.0 filed in The People's Republic of China on Nov. 23, 2015.

FIELD OF THE INVENTION

This invention relates to the field of pumps, and in particular, to a actuator and a pump using the actuator.

BACKGROUND OF THE INVENTION

As a kind of driving device, motors are widely used in various applications. A common application of the motors is using the motors to drive pumps to achieve the function of pumping water or evacuation. In a current common mechanism which uses a motor to drive a pump to perforin the work of pumping water or evacuation, a conventional complete motor is generally assembled to the pump, with an output shaft of the motor being connected to the pump to drive the pump to rotate. Because the motor is an independently-operable complete motor which includes components of two bearings, end covers, etc, the whole driving device has a large size and weight.

SUMMARY OF THE INVENTION

Accordingly, there is a desire for a compact actuator and a pump using the actuator.

In one aspect, a actuator used to drive a pump body is provided. The actuator includes a base comprising a mounting bracket, a transmission assembly and a motor received in the base. The motor includes a stator, a rotor, and a driving shaft fixed to the rotor. The driving shaft is connected to the transmission assembly. The base includes a mounting bracket. The mounting bracket is partly embedded in the motor.

Preferably, the mounting bracket comprises a connecting board positioned between the motor and the transmission assembly, and a sleeve extending from a side of the connecting board along an axial direction of the driving shaft, the stator is supported on sleeve, the driving shaft rotatably received in the sleeve, and the rotor is rotatably mounted around the stator.

Preferably, the sleeve is integrally formed with the connecting board.

Preferably, the base further comprises a rear cover, the rear cover is disposed at one side of the mounting bracket away from the stator, the actuator further comprises two supporting bearings for rotatably supporting the driving shaft, and the two supporting bearings are fixed to the rear cover and the mounting bracket close to the connecting board, respectively.

Preferably, the sleeve forms at least one guiding member to enable the stator attached thereto with a predetermined orientation.

Preferably, the motor is a brushless direct current motor, the motor further comprises a controller, the controller is disposed between the mounting bracket and the stator.

Preferably, the controller is fixed onto the connecting board.

Preferably, the base further comprises a front cover accommodating the motor, the connecting board and the front cover are connected through a snap-fit connection.

Preferably, the mounting bracket defines a receiving chamber accommodating the transmission assembly.

Preferably, the transmission assembly comprises a bearing seat, a transmission bearing, and an eccentric bushing, the transmission bearing is mounted in the bearing seat, the bearing seat is received in the receiving chamber, one side of the bearing seat is connected to the pump body, the eccentric bushing is fixedly sleeved on the driving shaft and rotatably mounted in the transmission bearing.

Preferably, the eccentric bushing is cylindrical and defines a through hole, an axis of the eccentric bushing is offset from an axis of the through hole, the driving shaft passes through the through hole of the eccentric bushing such that the eccentric bushing rotates along with the driving shaft.

Preferably, the stator is an armature, and the rotor is an excitation assembly with a plurality of permanent magnets.

In another aspect, a pump is provided which includes a pump body, an actuator for driving the pump body, the actuator includes a base, a transmission assembly received in the base; and a motor, the motor is an outer rotor motor and includes a stator directly fixed to the base, a rotor rotatably mounted around the stator, and a driving shaft connected to the transmission assembly and fixed to the rotor.

Preferably, the base comprises a mounting bracket and a front cover detachably assembled to one side of the mounting bracket, the stator is directly fixed to the mounting bracket, and the front cover receives the stator and the rotor.

Preferably, a sleeve protrudes from the mounting bracket, and the stator is fixedly supported on the sleeve.

Preferably, wherein the driving shaft is rotatably inserted in the sleeve.

Preferably, wherein the base further comprises a rear cover, the rear cover is disposed at one side of the mounting bracket away from the stator, the actuator further comprises two supporting bearings for rotatably supporting the driving shaft, and the two supporting bearings are mounted to the rear cover and the mounting bracket close to the stator, respectively.

Preferably, the driving shaft is connected with the pump body through an eccentric transmission assembly.

Preferably, the transmission assembly comprises a bearing seat, a transmission bearing, and an eccentric bushing, the transmission bearing is mounted in the bearing seat, one side of the bearing seat is connected to the pump body, the eccentric bushing is fixedly sleeved on the driving shaft and rotatably mounted in the transmission bearing.

Preferably, the eccentric bushing is cylindrical and defines a through hole, an axis of the eccentric bushing is offset from an axis of the through hole, the driving shaft passes through the through hole of the eccentric bushing such that the eccentric bushing rotates along with the driving shaft.

Below, embodiments of the present invention will be described in detail with reference to the accompanying drawings.

DETAILED DESCRIPTION OF THE PREFERRED EMBODIMENTS

The technical solutions of the embodiments of the present invention will be clearly and completely described as follows with reference to the accompanying drawings. Apparently, the embodiments as described below are merely part of, rather than all, embodiments of the present invention. Based on the embodiments of the present disclosure, any other embodiment obtained by a person skilled in the art without paying any creative effort shall fall within the protection scope of the present invention.

It is noted that, when a component is described to be "fixed" to another component, it can be directly fixed to the another component or there may be an intermediate component. When a component is described to be "connected" to another component, it can be directly connected to the another component or there may be an intermediate component. When a component is described to be "disposed" on another component, it can be directly disposed on the another component or there may be an intermediate component.

Unless otherwise specified, all technical and scientific terms have the ordinary meaning as understood by people skilled in the art. The terms used in this disclosure are illustrative rather than limiting.

Figure 1:
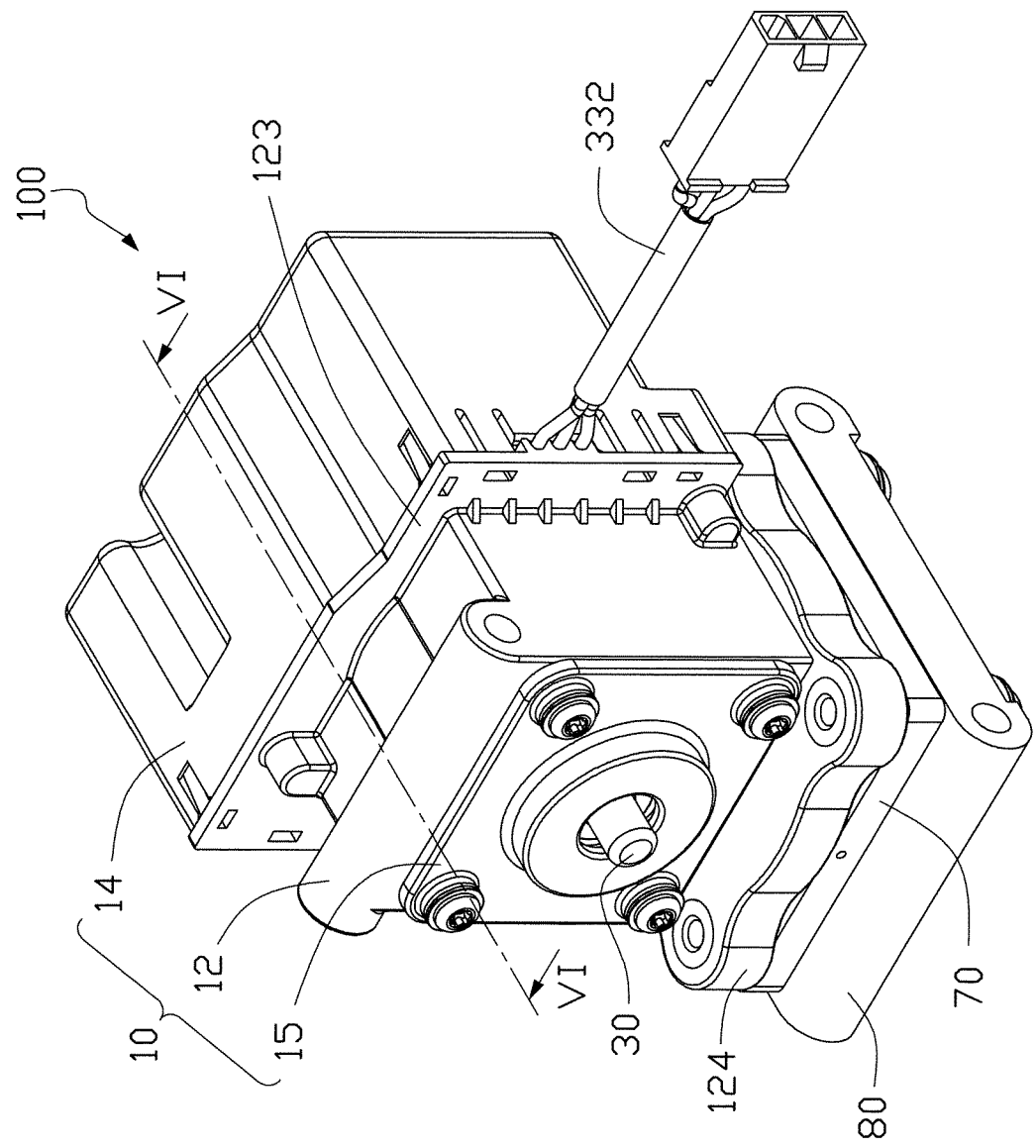
FIG. 1 is a perspective view of a pump according to a preferred embodiment of the present invention.
Figure 2:
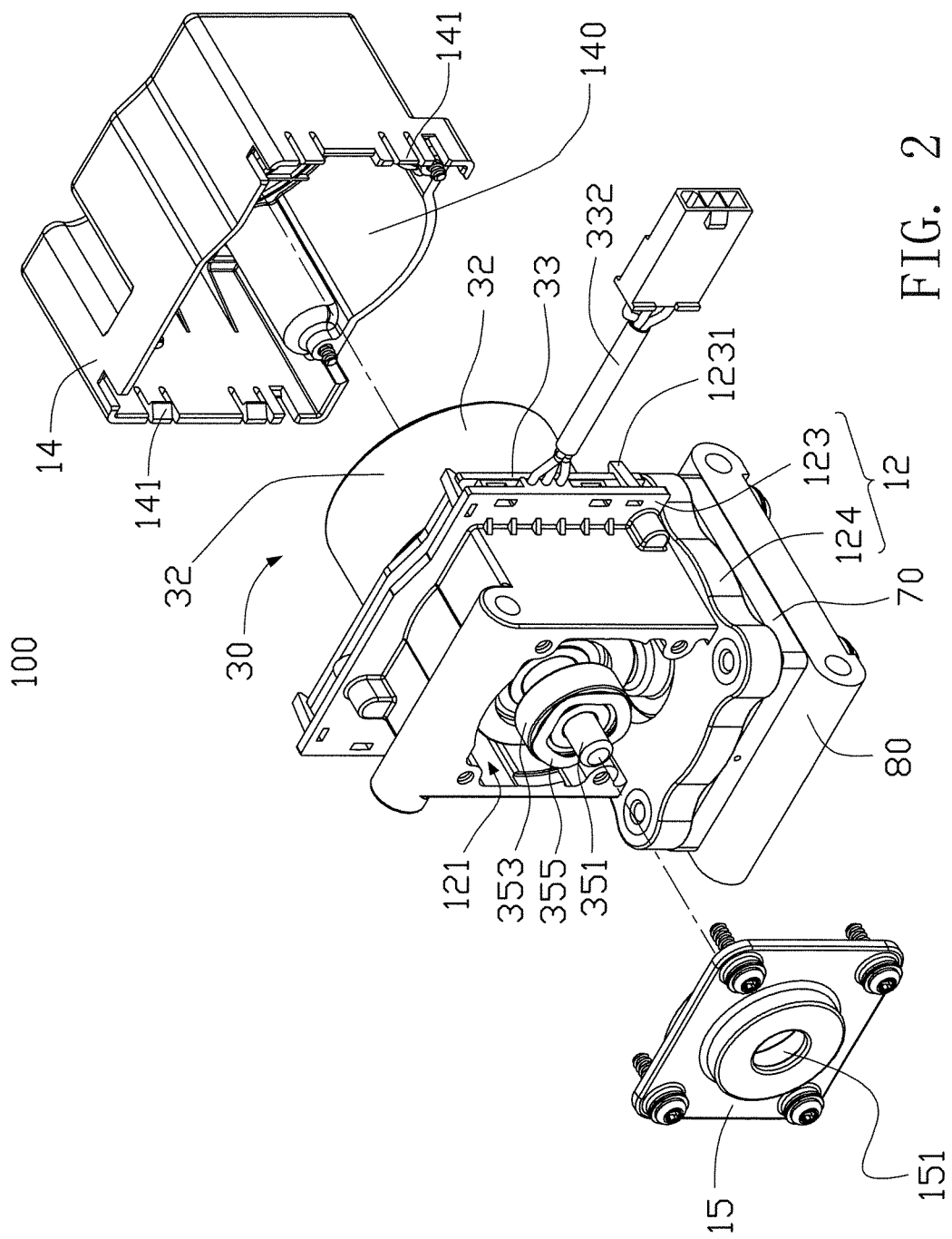
FIG. 2 is a perspective, partly exploded view of the pump of FIG. 1.

Referring to FIG. 1 and FIG. 2, a pump 100 according to a preferred embodiment of the present invention includes a pump body 70 and an actuator to driving the pump body 70. The actuator includes a base 10, a motor 30 mounted to the base 10, a transmission assembly 50 mounted around the motor 30, and two supporting bearings 353. The motor 30 includes a driving shaft 351 connecting with the transmission assembly 50.

In this embodiment, the base 10 is configured for enclosing the motor 30 and the transmission assembly 50 therein. The pump body 70 is mounted between the base 10 and the bottom support 80. The bottom support 80 is used to support the whole pump 100 on a supporting surface.

The base 10 includes a mounting bracket 12, a front cover 14, and a rear cover 15. The front cover 14 and the rear cover 15 are mounted at opposite sides of the mounting bracket 12.

Figure 3:
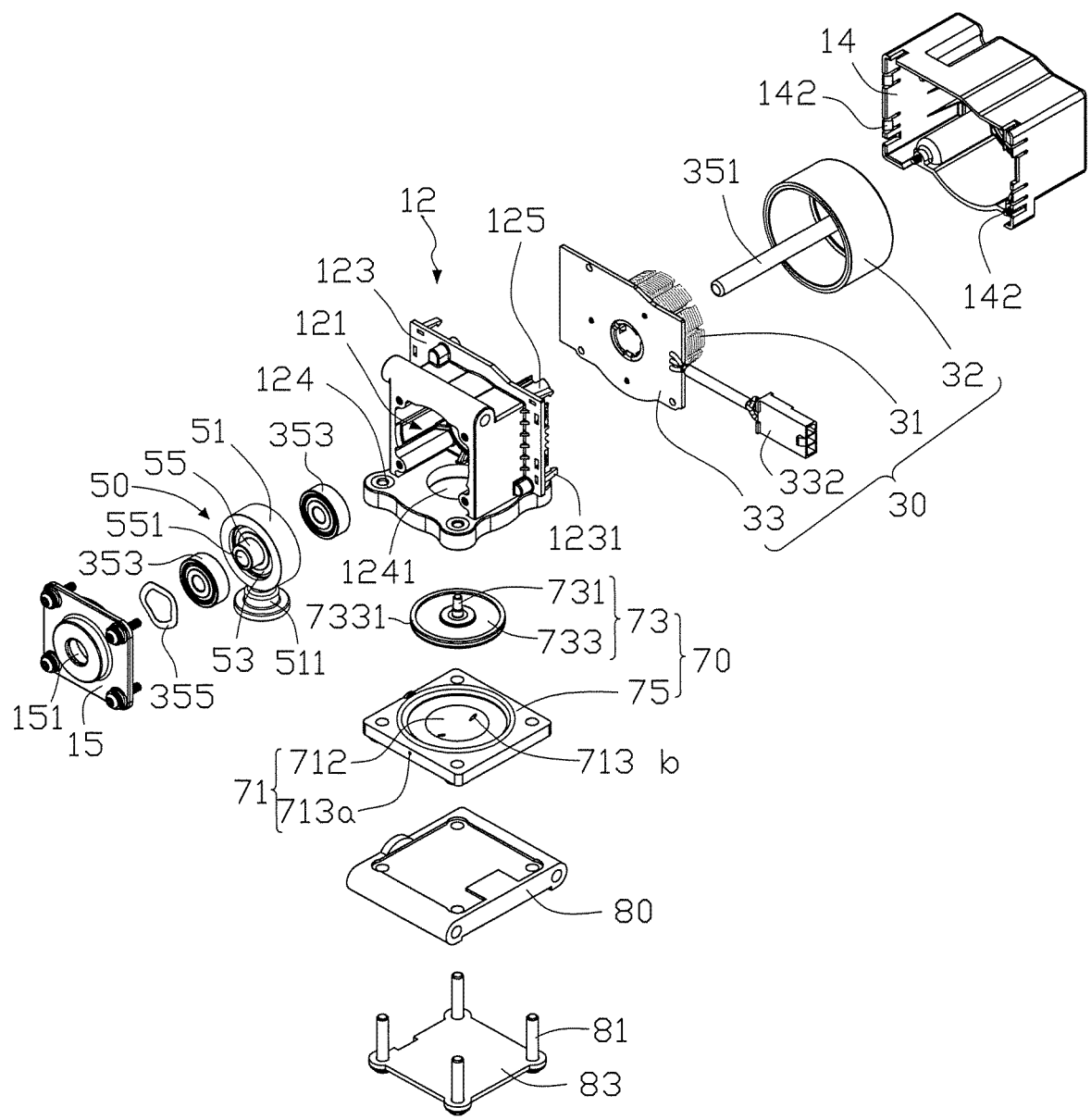
FIG. 3 is a perspective, exploded view of the pump of FIG. 1.

Referring also to FIG. 3, in this embodiment, the mounting bracket 12 is a plastic member being integrally formed as one piece, thus shortening the manufacturing process. In other embodiments, the mounting bracket 12 can also be a welding part or a spliced part made of a metal or alloy material through welding or bonding. The mounting bracket 12 includes a connecting board 123, a base plate 124, and a sleeve 125.

Figure 4:
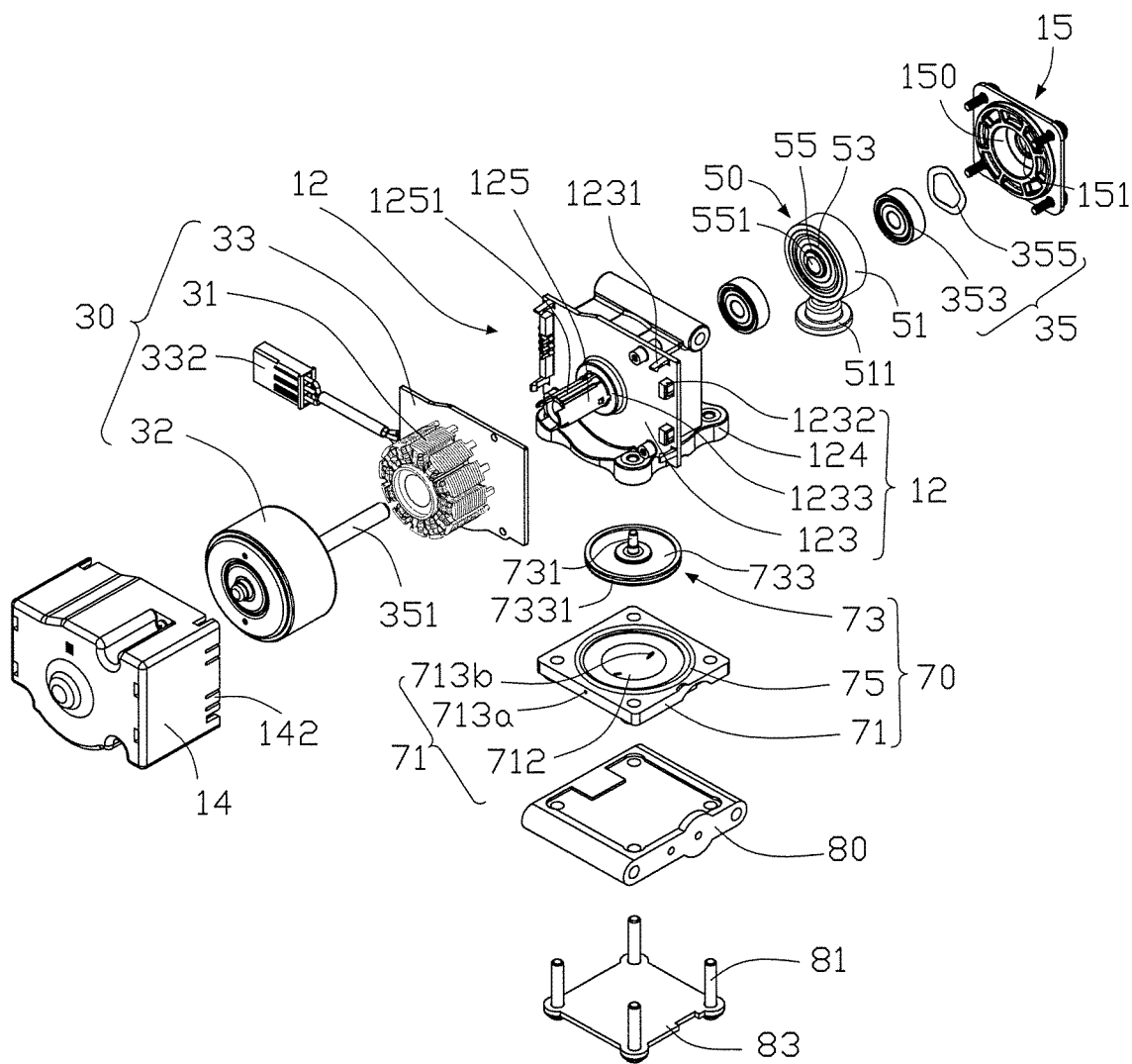
FIG. 4 is a perspective, exploded view of the pump of FIG. 1, viewed from another aspect.
Figure 5:
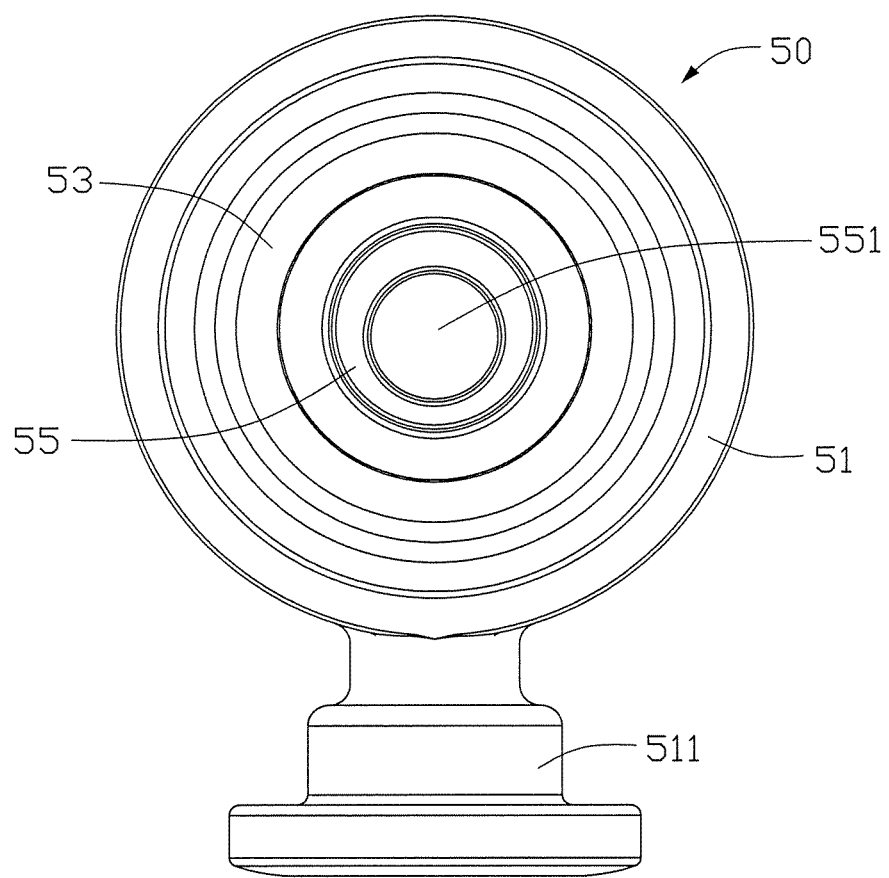
FIG. 5 is a perspective view of a transmission assembly of FIG. 2.
Figure 6:
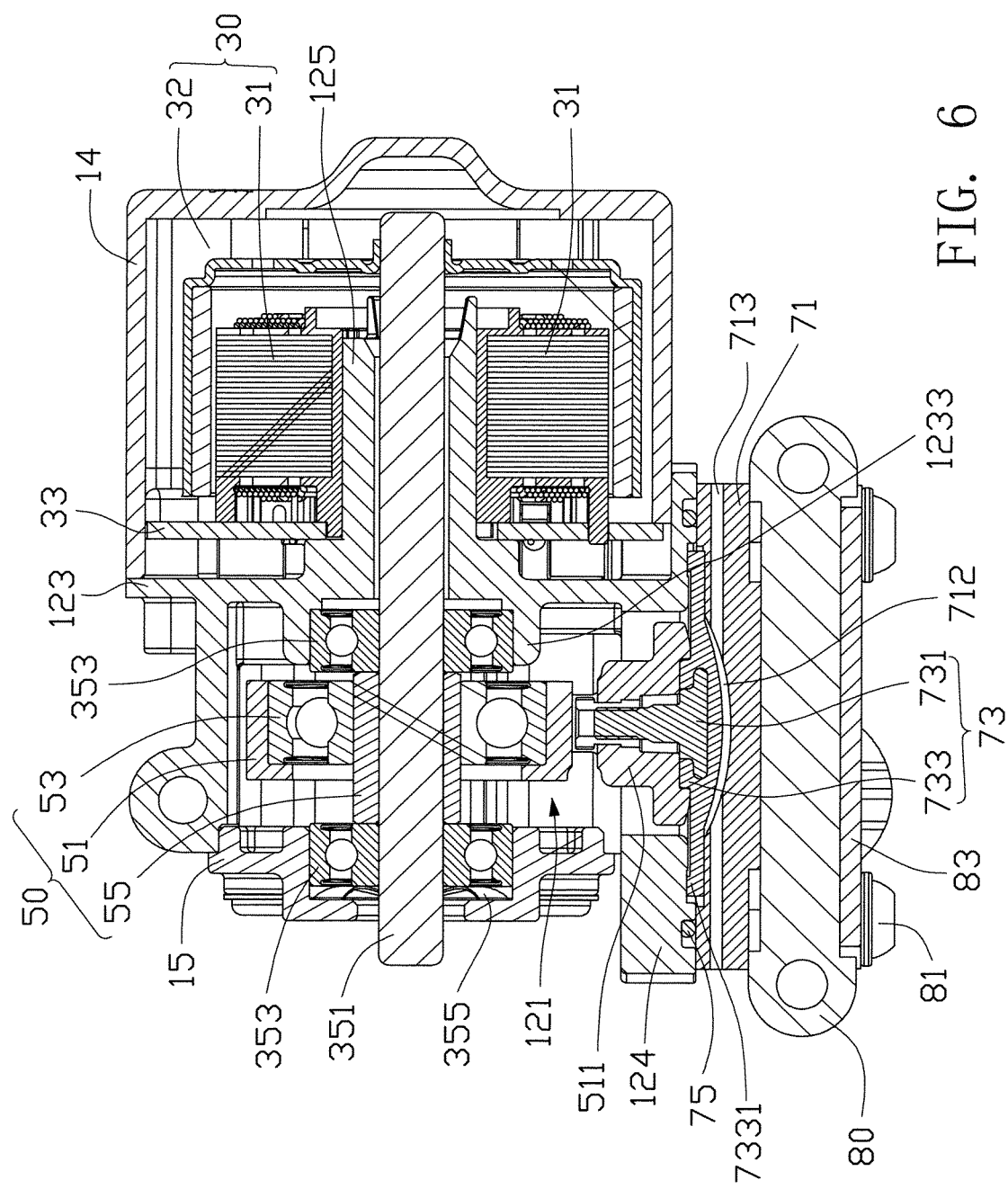
FIG. 6 is a sectional view of the pump of FIG. 1, taken along line Iv-IV thereof.

Referring also to FIG. 4 and FIG. 6, the mounting bracket 12 defining a receiving chamber 121, which is bounded by the connecting board 123 and the base plate 124. The receiving chamber 121 is configured for accommodating the transmission assembly 50. The connecting board 123 forms a plurality of catches 1231 and a plurality of engagement blocks 1232 at one side thereof opposite to the receiving chamber 121. In this embodiment, the plurality of catches 1231 and the plurality of engagement blocks 1232 are separately arranged along a circumferential direction of the connecting board 123. The connecting board 123 defines a through hole configured for the driving shaft passing therethough. A bearing jacket 1233 (shown in FIG. 6) protrudes from one side of the connecting board 123 away from the plurality of catches 1231 around the through hole of the connecting board 123.

The base plate 124 is substantially perpendicular to the connecting board 123. The base plate 124 defines a through hole 1241 with an axial direction perpendicular to the driving shaft 351. The through hole 1241 communicates with the receiving chamber 121. The pump body 70 is configured to be connected to the transmission assembly 50 via the through hole 1241.

In this embodiment, the sleeve 125 is substantially cylindrical. The sleeve 125 protrudes from one side of the connecting board 123 away from the receiving chamber 121. The sleeve 125 defining an axial hole communicates with the bearing hole 1233, to enable the driving shaft 351 to rotatably extend through the sleeve 125 and the bearing hole 1233. The sleeve 125 forms at least one guiding member 1251 on an outer puerperal surface thereof. The guiding member 1251 extends along an axial direction of the sleeve 125. The guiding members 1251 are provided to facilitate mounting the motor 30 around the sleeve 125 with a predetermined orientation.

In this embodiment, the front cover 14 is substantially hollow cubic member with an opening 140 defined in a side thereof. The front cover 14 coves the motor 30 and is connected to the connecting board 123 with the opening 140 facing the connecting board 123. The front cover 14 forms a plurality of catches 142 adjacent to and around the opening of the front cover 14 to be cooperatively engages with the engagement block 1232 to fixedly attach the front cover 14 to the connecting board 123. It should be understood that the catches 142 can also be formed on the connecting board 123, and correspondingly the blocks 1232 are formed on the front cover 14.

The rear cover 15 is mounted at one side of the mounting bracket 12 away from the motor 30 to close the receiving chamber 121. The rear cover 15 defines a recess 150 in a side facing the mounting bracket 12 and a through hole 151 communicating with the recess, configured for rotatably receiving the driving shaft 351.

The motor 30 is an outer rotor motor, and includes a stator 31 supporting on the sleeve 125, and a rotor 32 rotatably surrounding the stator and fixed to the driving shaft 351. In one embodiment, the motor 30 is a brushless direct current motor, and further includes a controller 33. In this embodiment, the stator 31 is an armature, which includes a core and windings wound around the core. The rotor 32 is an excitation assembly, which includes a plurality of permanent magnets. In should be understood that, in other embodiments, the stator 31 can also be an excitation assembly. Correspondingly, the rotor 32 can also be the armature.

The stator 31 is mounted around the sleeve 125. An inner surface of the stator 31 contacting the sleeve 125 forms a plurality of guiding grooves (not shown) mating with the guiding members 1251 to enable the stator attached to the sleeve 125 with a predetermined orientation. The rotor 32 is rotatably mounted around the stator 31. The rotor 32 rotates about the stator 31 after the stator 31 is energized. In present invention, the controller 33 is based on a PCB, which defines a though hole provided for the sleeve 125 passing through. In this embodiment, the controller 33 is mounted between the connecting board 123 and the stator 31. The plurality of catches 1231 engages with the controller 33 to fix the controller 33 at one side of the connecting board 123. The controller 33 and the stator 31 are connected electrically, thereby providing electric power to the stator 31 and controlling power output of the motor 30 by controlling amplitude and direction of an electric current in the stator 31. The controller 33 includes a wire 332 for connecting to an external power supply.

Referring also to FIG. 6, the supporting bearings 353 are respectively mounted in the recess 150 of the rear cover 15, and the bearing jacket 1233 of the mounting bracket 12. A gasket 355 is disposed in the mounting groove 151 and sandwiched between the corresponding supporting bearing 353 and the rear cover 15. In this embodiment, the gasket 355 is a corrugated gasket 355, which is used to adjust a distance between the supporting bearing 353 and the end surface of the rear cover 15 and reduce vibration between the supporting bearing 353 and the rear cover 15. One end of the driving shaft 351 is fixed to the rotor 32, and the other end of the driving shaft 351 passes sequentially through the sleeve 125, one of the two supporting bearings 353, the transmission assembly 50, and the other one of the two supporting bearings 353. Therefore, the driving shaft 351 is rotatably supported by the sleeve 125 and the two supporting bearing 353.

The transmission assembly 50 includes a bearing seat 51, a transmission bearing 53 mounted in the bearing seat 51, and an eccentric bushing 55 mounted in the transmission bearing 53. In this embodiment, the bearing seat 51 is generally annular and hollow, which forms a connector 511 at one side thereof for connecting with the pump body 70. The transmission bearing 53 is fixed in the bearing seat 51. The eccentric bushing 55 is fixedly sleeved on the driving shaft 351 and rotatably mounted in the transmission bearing.

In this embodiment, the eccentric bushing 55 is cylindrical and defines a through hole for the driving shaft 351 passing therethrough. an axis of the eccentric bushing 55 is offset from an axis of the through hole 551. In other words, a thicknesses of wall of the eccentric bushing 55 is ununiform along an peripheral direction thereof.

In this embodiment, the pump body 70 is driven by the actuator for draining liquid. The pump body 70 includes a mating member 71, a pushing assembly 73, and a sealing ring 75. The mating member 71 defines a chamber 712 and at least two passages 713a and 713b communicating with the chamber 712. One end of each of the passages 713a and 713b communicates with the chamber 712, and the other end of each of the passages 713a and 713b interfacing with a one-way valve (not shown), thereby forming inlet and outlet passages of the liquid. The pushing assembly 73 includes an linking member 731 and a pump head 733 adapted for coving the chamber 712. One end of the linking member 731 is connected to the connector 511, and the other end of the linking member 731 is connected to a generally central area of the pump head 733.

In this embodiment, the pump head 733 is made of an elastic material, and is generally disc-shaped. An outer diameter of the pump head 733 is greater than an outer diameter of the chamber 712. An annular seal 7331 is disposed on the pump head 733 along a circumferential direction thereof. Opposite sides of the annular seal 7331 abut against the base plate 124 and the mating member 71, respectively, such that the chamber 712 forms a sealed environment. The linking member 731 can force the pump head 733 to be deformed axially within a certain range, thus establishing a vacuum environment in an interior of the chamber 712. The sealing ring 75 is disposed on the mating member 71 around the chamber 712, for further enhancing the sealing effectiveness.

The bottom support 80 is disposed at one side of the mating member 71 away from the base plate 124. In this embodiment, the bottom support 80 is connected to the base plate 124 through a plurality of screws 81 which extends sequentially through the bottom support 80 and the mating member 71. For fixing the bottom support 80 more filially, a backing plate 83 can be arranged between the bottom support 80 and the screws 81. It should be understood that the backing plate 83 can also be an anti-loosening component such as a gasket or a washer.

In assembly of the pump, an end of the linking member 731 with the pump head 733 mounted thereon is connected to the connector 511 via the through hole 1241 of the base plate 124. The screws 81 extend sequentially through the bearing plate 83, the bottom support 80, and the mating member 71 to assemble the pump body 70 onto the base plate 124.

In use, the motor 30 is energized. The driving shaft 351 rotates with the rotor 32. The eccentric bushing 55 rotates in synchronization with the driving shaft 351. Since the eccentric bushing 55 has an asymmetric design, the eccentric bushing 55 drives the bearing seat 51 and the pushing assembly 73 connected to the bearing seat to move along an axial direction of the through hole 1241 back and forth. In particular, in a period of a rotation of the eccentric bushing 55 in which a thicker wall side of the eccentric bushing 55 is moved gradually closer to the base plate 124, the eccentric bushing 55 drives the bearing seat 51 and the pushing assembly 73 towards the mating member 71. In another period of the rotation of the eccentric bushing 55 in which a thinner wall side of the eccentric bushing 55 is moved gradually closer to the base plate 124, the eccentric bushing 55 drives the bearing seat 51 and the pushing assembly 73 away from the mating member 71. When the pushing assembly 73 moves away the mating member 71, an air pressure in the chamber 712 is decreased to generate a suction force to draw the liquid through one of the one-way valves and the passages 713a into the chamber 712; When the pushing assembly 73 moves towards the mating member 71, an air pressure in the chamber 712 is increased to drained out the liquid in the chamber through the other one-way valve and the passage 713b, thus achieving the drainage of the liquid.

Although the invention is described with reference to one or more embodiments, the above description of the embodiments is used only to enable people skilled in the art to practice or use the invention. It should be appreciated by those skilled in the art that various modifications are possible without departing from the spirit or scope of the present invention. The embodiments illustrated herein should not be interpreted as limits to the present invention, and the scope of the invention is to be determined by reference to the claims that follow.

The invention claimed is:

1. An actuator for driving a pump body, the actuator comprising:
   a base comprising a mounting bracket;
   a transmission assembly; and
   a motor comprising a stator, a rotor rotatably relative to the stator, and a driving shaft fixed to the rotor, the driving shaft being connected to the transmission assembly, the mounting bracket being partly embedded in the motor;

wherein the mounting bracket comprises a connecting board positioned between the motor and the transmission assembly, and a sleeve extending from a side of the connecting board along an axial direction of the driving shaft, the rotor comprises a cylindrical portion fixed to the driving shaft; the stator is supported on the sleeve, the stator and the sleeve are received in the cylindrical portion of the rotor, the driving shaft rotatably received in the sleeve;

wherein the rotor and the transmission assembly are respectively arranged at opposite sides of the connecting board, the driving shaft extends through the connecting board, and rotatably supported by at least one supporting bearing, each of said at least one supporting bearing configured to rotatably support the driving shaft, and the transmission assembly are located at the same side of the connecting board.

2. The actuator of claim 1, wherein the sleeve is integrally formed with the connecting board.

3. The actuator of claim 1, wherein the base further comprises a rear cover, the rear cover is disposed at one side of the mounting bracket away from the stator, said at least one supporting bearing comprises, and the two supporting bearings are fixed to the rear cover and the mounting bracket close to the connecting board, respectively.

4. The actuator of claim 1, wherein the sleeve forms at least one guiding member to enable the stator attached thereto with a predetermined orientation.

5. The actuator of claim 1, wherein the motor is a brushless direct current motor, the motor further comprises a controller, the controller is disposed between the mounting bracket and the stator.

6. The actuator of claim 5, wherein the controller is fixed onto the connecting board.

7. The actuator of claim 1, wherein the base further comprises a front cover accommodating the motor, the connecting board and the front cover are connected through a snap-fit connection.

8. The actuator of claim 1, wherein the mounting bracket defines a receiving chamber accommodating the transmission assembly.

9. The actuator of claim 8, wherein the transmission assembly comprises a bearing seat, a transmission bearing, and an eccentric bushing, the transmission bearing is mounted in the bearing seat, the bearing seat is received in the receiving chamber, one side of the bearing seat is connected to the pump body, the eccentric bushing is fixedly sleeved on the driving shaft and rotatably mounted in the transmission bearing.

10. The actuator of claim 9, wherein the eccentric bushing is cylindrical and defines a through hole, an axis of the eccentric bushing is offset from an axis of the through hole, the driving shaft passes through the through hole of the eccentric bushing such that the eccentric bushing rotates along with the driving shaft.

11. The actuator of claim 1, wherein the stator is an armature, and the rotor is an excitation assembly with a plurality of permanent magnets.

12. A pump comprising:
a pump body,
an actuator for driving the pump body, the actuator comprising:
a base,
a transmission assembly received in the base; and
a motor being an outer rotor motor and comprising a stator directly fixed to the base, a rotor rotatably mounted around the stator, and a driving shaft connected to the transmission assembly and fixed to the rotor;
wherein the base comprises a mounting bracket and a front cover detachably assembled to one side of the mounting bracket, the stator is directly fixed to the mounting bracket, and the front cover receives the stator and the rotor,
wherein a sleeve protrudes from the mounting bracket, and the stator is fixedly supported on the sleeve, and
wherein the driving shaft is rotatably inserted in the sleeve and rotatably supported by at least one supporting bearing, the base further comprises a rear cover, the rear cover is disposed at one side of the mounting bracket away from the stator, each of said at least one supporting bearing configured to rotatably support the driving shaft is located between the rear cover and the mounting bracket.

13. The pump of claim 12, wherein said at least one supporting bearing comprises two supporting bearings, and the two supporting bearings are mounted to a rear cover and the mounting bracket close to the stator, respectively.

14. The pump of claim 12, wherein the driving shaft is connected with the pump body through an eccentric transmission assembly.

15. The pump of claim 12, wherein the transmission assembly comprises a bearing seat, a transmission bearing, and an eccentric bushing, the transmission bearing is mounted in the bearing seat, one side of the bearing seat is connected to the pump body, the eccentric bushing is fixedly sleeved on the driving shaft and rotatably mounted in the transmission bearing.

16. The pump of claim 15, wherein the eccentric bushing is cylindrical and defines a through hole, an axis of the eccentric bushing is offset from an axis of the through hole, the driving shaft passes through the through hole of the eccentric bushing such that the eccentric bushing rotates along with the driving shaft.

* * * * *